(12) United States Patent
Zhong et al.

(10) Patent No.: US 12,112,051 B2
(45) Date of Patent: Oct. 8, 2024

(54) VALID NODE MANAGEMENT METHOD, MEMORY STORAGE DEVICE AND MEMORY CONTROL CIRCUIT UNIT

(71) Applicant: Hefei Core Storage Electronic Limited, Anhui (CN)

(72) Inventors: Wei Zhong, Anhui (CN); Kai-Di Zhu, Anhui (CN); Zhi Wang, Anhui (CN); Xiaoyang Zhang, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 0 days.

(21) Appl. No.: 18/297,006

(22) Filed: Apr. 7, 2023

(65) Prior Publication Data

US 2024/0264755 A1 Aug. 8, 2024

(30) Foreign Application Priority Data

Feb. 3, 2023 (CN) .......................... 202310120168.5

(51) Int. Cl.
  *G06F 3/06* (2006.01)
(52) U.S. Cl.
  CPC .......... *G06F 3/0634* (2013.01); *G06F 3/0604* (2013.01); *G06F 3/0679* (2013.01)
(58) Field of Classification Search
  CPC ..... G06F 3/0634; G06F 3/0604; G06F 3/0679
  See application file for complete search history.

(56) References Cited

U.S. PATENT DOCUMENTS

| | | | |
|---|---|---|---|
| 7,590,793 B2 * | 9/2009 | Osakabe | G11C 16/105 |
| | | | 714/48 |
| 2015/0220277 A1 * | 8/2015 | Lee | G06F 3/0688 |
| | | | 711/103 |
| 2015/0324284 A1 | 11/2015 | Kim et al. | |
| 2020/0057725 A1 | 2/2020 | Cho et al. | |
| 2020/0201558 A1 | 6/2020 | Cho et al. | |
| 2022/0083278 A1 | 3/2022 | Kanno | |
| 2022/0414003 A1 * | 12/2022 | Duan | G06F 12/0253 |

FOREIGN PATENT DOCUMENTS

| | | |
|---|---|---|
| TW | I597605 | 9/2017 |
| TW | 202246985 | 12/2022 |
| TW | I785876 | 12/2022 |

OTHER PUBLICATIONS

"Office Action of Taiwan Counterpart Application", issued on Dec. 12, 2023, p. 1-p. 7.

* cited by examiner

*Primary Examiner* — Eric Cardwell
(74) *Attorney, Agent, or Firm* — JCIPRNET

(57) ABSTRACT

A valid node management method, a memory storage device and a memory control circuit unit are disclosed. The method includes: establishing a valid node management table corresponding to a first physical management unit; storing valid node management data in the valid node management table, wherein the valid node management data reflects a distribution status of a valid node in the first physical management unit; receiving an operation command from a host system, wherein the operation command is configured to change a data storage status of the first physical management unit; and updating the valid node management data in the valid node management table in response to the operation command.

18 Claims, 10 Drawing Sheets

VALID NODE MANAGEMENT METHOD, MEMORY STORAGE DEVICE AND MEMORY CONTROL CIRCUIT UNIT

CROSS-REFERENCE TO RELATED APPLICATION

This application claims the priority benefit of China application serial no. 202310120168.5, filed on Feb. 3, 2023. The entirety of the above-mentioned patent application is hereby incorporated by reference herein and made a part of this specification.

BACKGROUND

Technical Field

The disclosure relates to a memory management technology, and in particular relates to a valid node management method, a memory storage device, and a memory control circuit unit.

Description of Related Art

As smartphones, tablets, and personal computers have grown rapidly in recent years, the demand of the consumers for storage media has also increased rapidly. Since a rewritable non-volatile memory module (e.g. a flash memory) has the characteristics of data non-volatility, power saving, small size, and having no mechanical structure, it is very suitable for being built in a variety of portable multimedia devices as exemplified above.

Generally speaking, when data integration operations such as garbage collection are to be performed, the memory controller scans at least a portion of the physical blocks in the rewritable non-volatile memory module to determine the distribution of valid nodes in each physical block according to the physical to logical (P2L) mapping information stored in the physical block and the logical to physical mapping information stored in the logical to physical (L2P) mapping table, thereby performing the integration operation according to the distribution. However, the scanning of the physical blocks consumes a lot of time and system resources, resulting in low efficiency of the data integration operation.

SUMMARY

The disclosure provides a valid node management method, a memory storage device and a memory control circuit unit, which may improve the management efficiency of the valid nodes in the physical management unit.

An exemplary embodiment of the disclosure provides a valid node management method for a rewritable non-volatile memory module. The rewritable non-volatile memory module includes multiple physical management units. The valid node management method includes the following operation. A valid node management table is established corresponding to a first physical management unit in the physical management units. Valid node management data is stored in the valid node management table, in which the valid node management data reflects a distribution status of a valid node in the first physical management unit. An operation command is received from a host system, in which the operation command is configured to change a data storage status of the first physical management unit. In response to the operation command, the valid node management data is updated in the valid node management table.

An exemplary embodiment of the disclosure further provides a memory storage device, which includes a connection interface unit, a rewritable non-volatile memory module, and a memory control circuit unit. The connection interface unit is configured to couple to a host system. The rewritable non-volatile memory module includes multiple physical management units. The memory control circuit unit is coupled to the connection interface unit and the rewritable non-volatile memory module. The memory control circuit unit is configured to perform the following operation. A valid node management table is established corresponding to a first physical management unit in the physical management units. Valid node management data is stored in the valid node management table, in which the valid node management data reflects a distribution status of a valid node in the first physical management unit. An operation command is received from a host system, in which the operation command is configured to change a data storage status of the first physical management unit. In response to the operation command, the valid node management data is updated in the valid node management table.

An exemplary embodiment of the disclosure further provides a memory control circuit unit for controlling a rewritable non-volatile memory module. The rewritable non-volatile memory module includes multiple physical management units. The memory control circuit unit includes a host interface, a memory interface, and a memory management circuit. The host interface is configured to couple to the host system. The memory interface is configured to couple to the rewritable non-volatile memory module. The memory management circuit is coupled to the host interface and the memory interface. The memory management circuit is configured to perform the following operation. A valid node management table is established corresponding to a first physical management unit in the physical management units. Valid node management data is stored in the valid node management table, in which the valid node management data reflects a distribution status of a valid node in the first physical management unit. An operation command is received from a host system, in which the operation command is configured to change a data storage status of the first physical management unit. In response to the operation command, the valid node management data is updated in the valid node management table.

Based on the above, after establishing the valid node management table corresponding to the first physical management unit, the valid node management data may be stored in the valid node management table to reflect the distribution status of valid nodes in the first physical management unit. Then, in response to receiving an operation command for changing the data storage status of the first physical management unit from the host system, the valid node management data in the valid node management table may be updated. Thereby, the management efficiency of valid nodes in the physical management unit may be improved.

DETAILED DESCRIPTION OF DISCLOSED EMBODIMENTS

In general, a memory storage device (also referred to as a memory storage system) includes a rewritable non-volatile memory module and a controller (also referred to as a control circuit). The memory storage device may be used with a host system so that the host system may write data to or read data from the memory storage device.

Figure 1:
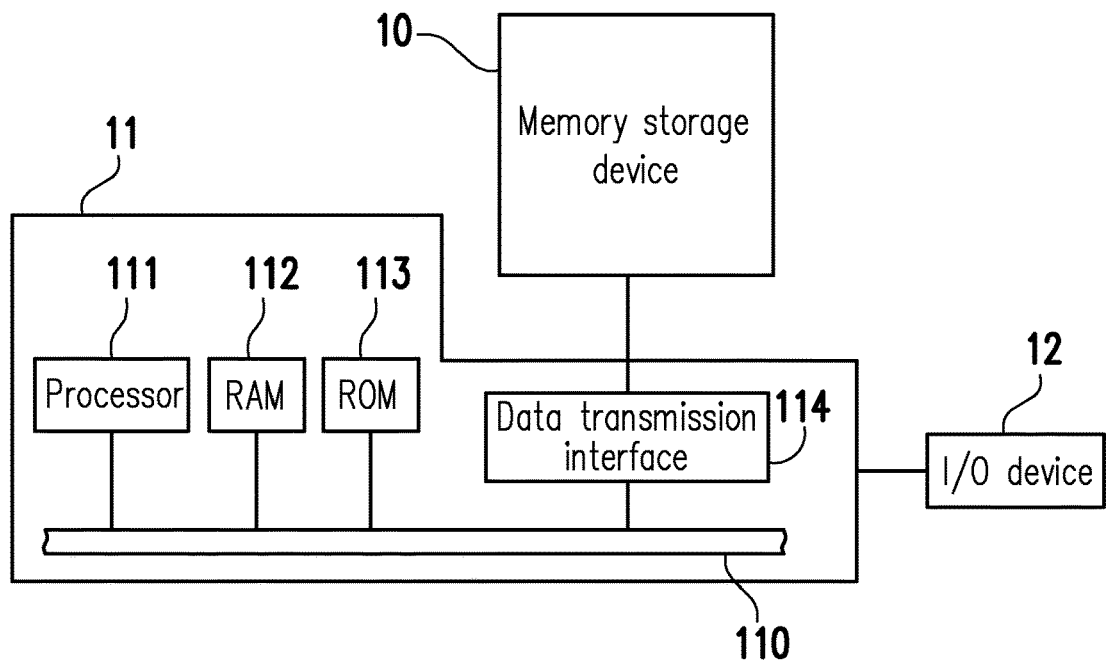
FIG. 1 is a schematic diagram of a host system, a memory storage device, and an input/output (I/O) device according to an exemplary embodiment of the disclosure.
Figure 2:
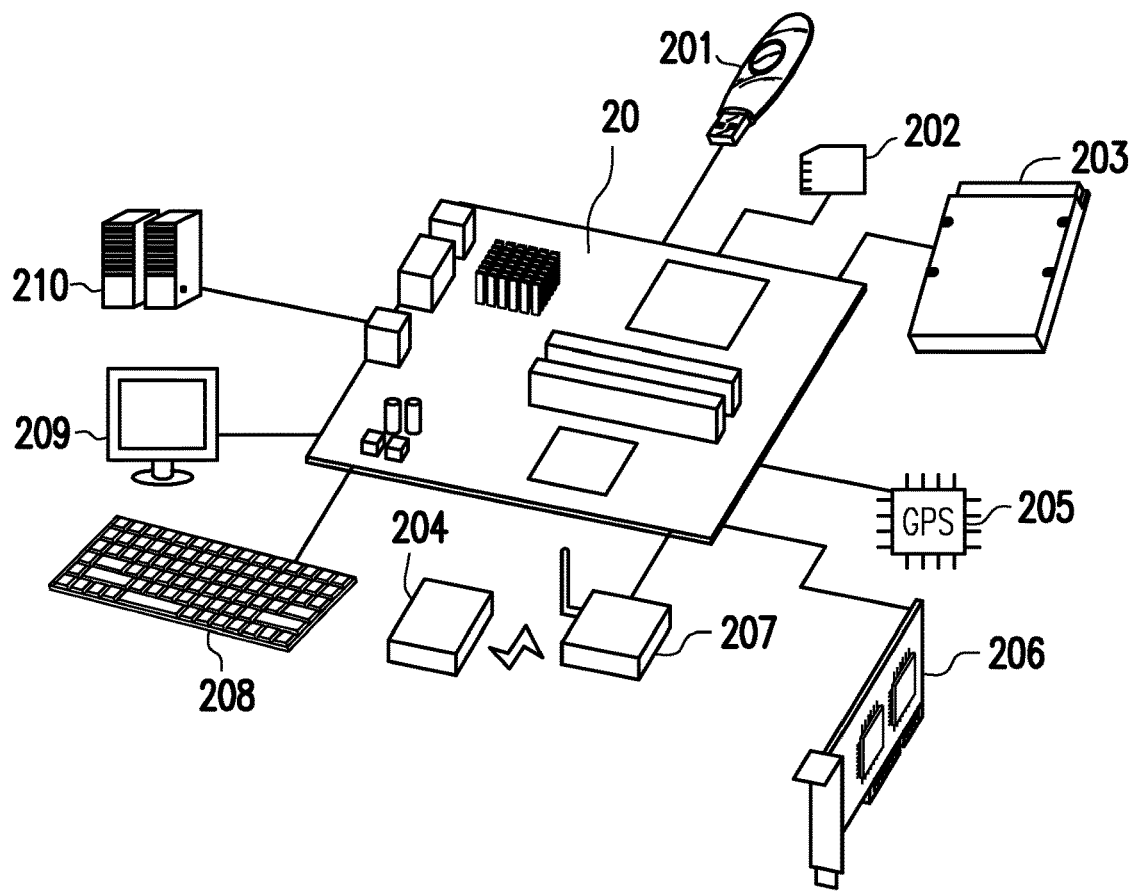
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Referring to FIG. 1 and FIG. 2, a host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to a memory storage device 10 through the data transfer interface 114. For example, the host system 11 may store data to or read data from the memory storage device 10 via the data transmission interface 114. In addition, the host system 11 may be coupled to an I/O device 12 through the system bus 110. For example, the host system 11 may transmit output signals to or receive input signals from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. The motherboard 20 may be coupled to the memory storage device 10 through the data transmission interface 114 via a wired or wireless connection.

In an exemplary embodiment, the memory storage device 10 may be, for example, a flash drive 201, a memory card 202, a solid state drive (SSD) 203, or a wireless memory storage device 204. The wireless memory storage device 204 may be a memory storage device based on various wireless communication technologies, such as a near field communication (NFC) memory storage device, a wireless fax (WiFi) memory storage device, a Bluetooth memory storage device, a low power Bluetooth memory storage device (e.g. iBeacon), etc. In addition, the motherboard 20 may also be coupled to various I/O devices, such as a global positioning system (GPS) module 205, a network interface card 206, a wireless transmission device 207, a keyboard 208, a screen 209, a speaker 210, etc., through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include the memory storage device 30 and the host system 31 of FIG. 3.

Figure 3:
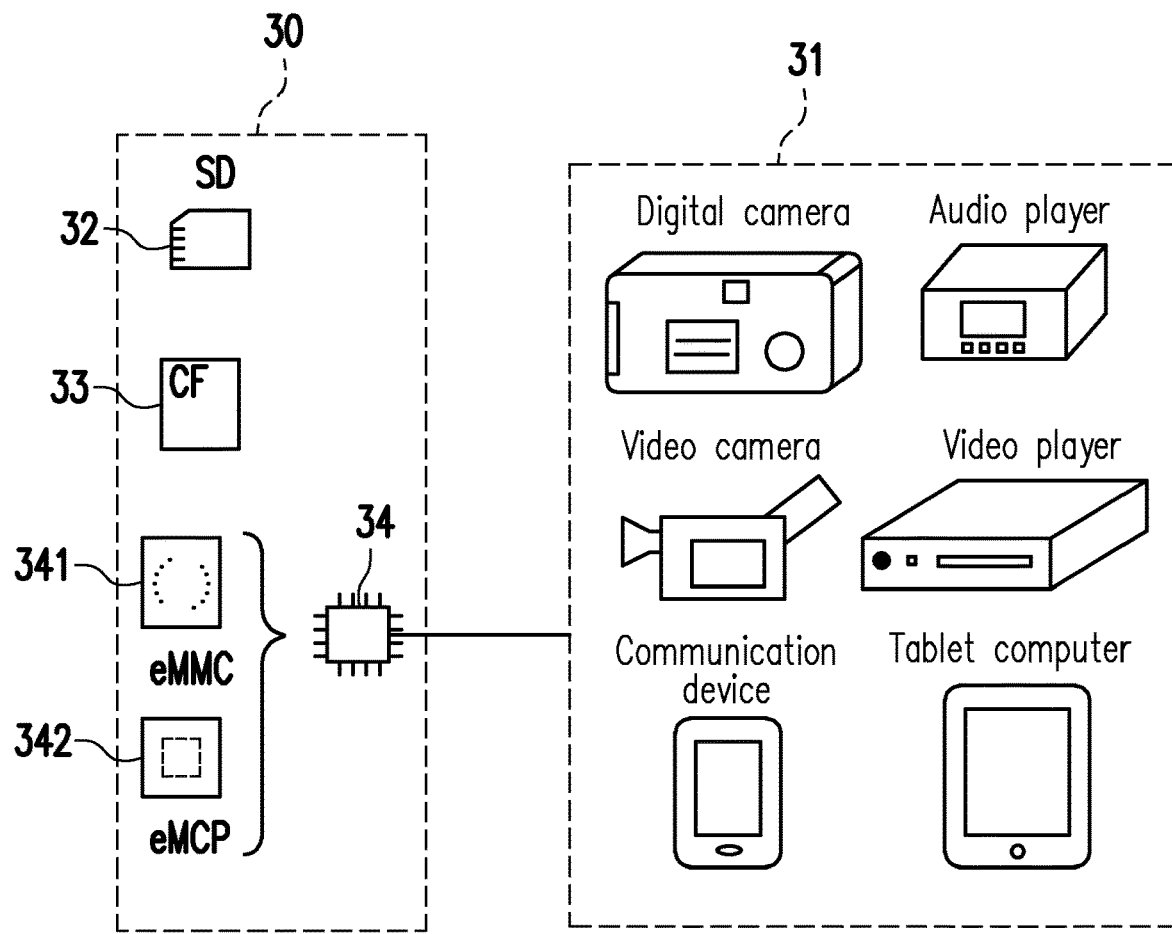
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Referring to FIG. 3, the memory storage device 30 may be used in conjunction with the host system 31 to store data. For example, the host system 31 may be a digital camera, a video camera, a communication device, an audio player, a video player, or a tablet computer system. For example, the memory storage device 30 may be various non-volatile memory storage devices, such as a secure digital (SD) card 32, a compact flash (CF) card 33, or an embedded storage device 34, etc., used in the host system 31. The embedded storage device 34 includes various embedded storage devices that directly couple a memory module to a substrate of the host system, such as an embedded multimedia card (eMMC) 341 and/or an embedded multi-chip package (eMCP) storage device 342, etc.

Figure 4:
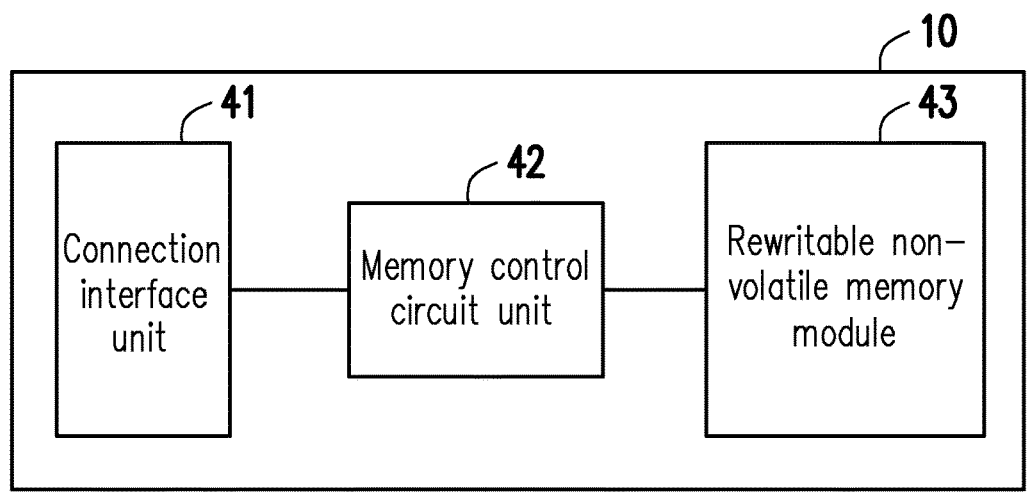
FIG. 4 is a schematic diagram of a memory storage device according to an exemplary embodiment of the disclosure.

FIG. 4 is a schematic diagram of a memory storage device according to an exemplary embodiment of the disclosure. Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI Express) standard. In an exemplary embodiment, the connection interface unit 41 may also be compliant to the serial advanced technology attachment (SATA) standard, the parallel advanced technology attachment (PATA) standard, the institute of electrical and electronics engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 may be packaged in a chip with the memory control circuit unit 42, or the connection interface unit 41 may be disposed outside a chip including the memory control circuit unit 42.

The memory control circuit unit 42 is coupled to the connection interface unit 41 and the rewritable non-volatile memory module 43. The memory control circuit unit 42 is configured to execute multiple logic gates or control commands implemented in a hardware form or a firmware form and to perform operations such as writing, reading, and erasing of data in the rewritable non-volatile memory module 43 according to the commands of the host system 11.

The rewritable non-volatile memory module 43 is configured to store the data written by the host system 11. The rewritable non-volatile memory module 43 may include a single level cell (SLC) NAND-type flash memory module (i.e., a flash memory that may store 1 bit in one memory cell), multi-level cell (MLC) NAND-type flash memory module (i.e., a flash memory module that may store 2 bits in one memory cell), a triple level cell (TLC) NAND-type flash memory module (i.e., a flash memory module that may store 3 bits in one memory cell), a quad level cell (QLC) NAND-type flash memory module (i.e., a flash memory module that may store 4 bits in one memory cell), other flash memory modules, or other memory modules with the same characteristics.

Each memory cell in the rewritable non-volatile memory module 43 stores one or more bits by a change in a voltage (also referred to as a threshold voltage hereinafter). Specifically, there is a charge trapping layer between a control gate and a channel of each of the memory cells. By applying a write voltage to the control gate, the amount of electrons in the charge trapping layer may be changed, thereby changing the threshold voltage of the memory cell. This operation of changing the threshold voltage of the memory cell is also referred to as "writing data to the memory cell" or "programming the memory cell". As the threshold voltage changes, each of the memory cells in the rewritable non-volatile memory module 43 has multiple storage statuses. By applying a read voltage, it may be determined which storage status a memory cell belongs to, thereby obtaining the one or more bits stored in the memory cell.

In an exemplary embodiment, the memory cells of the rewritable non-volatile memory module 43 may constitute multiple physical programming units, and the physical programming units may constitute multiple physical erasing units. Specifically, memory cells on the same word line may form one or more physical programming units. If each memory cell may store two or more bits, the physical programming units on the same word line may be classified at least as lower physical programming units and upper physical programming units. For example, the least significant bit (LSB) of a memory cell belongs to a lower physical programming unit, and the most significant bit (MSB) of a memory cell belongs to an upper physical programming unit. Generally, in an MLC NAND flash memory, the write speed of the lower physical programming unit is greater than the write speed of the upper physical programming unit, and/or the reliability of the lower physical programming unit is higher than the reliability of the upper physical programming unit.

In the present exemplary embodiment, the physical programming unit is the minimum unit for programming. That is, the physical programming unit is the minimum unit for write data. For example, the physical programming unit may be a physical page or a physical sector. If the physical programming unit is a physical page, then the physical programming unit may include a data bit area and a redundancy bit area. The data bit area includes multiple physical sectors is configured to store user data, and the redundant bit area is configured to store system data (e.g., management data such as error correction codes). In an exemplary embodiment, the data bit area includes 32 physical sectors, and the size of a physical sector is 512 bytes (B). However, in other exemplary embodiments, the data bit area may also include 8, 16, or a greater or lesser number of physical sectors, and the size of each of the physical sectors may also be larger or smaller. On the other hand, the physical erasing unit is the minimum unit for erasing. That is, each of the physical erasing units includes the smallest number of memory cells to be erased together. For example, the physical erasing unit is a physical block.

Figure 5:
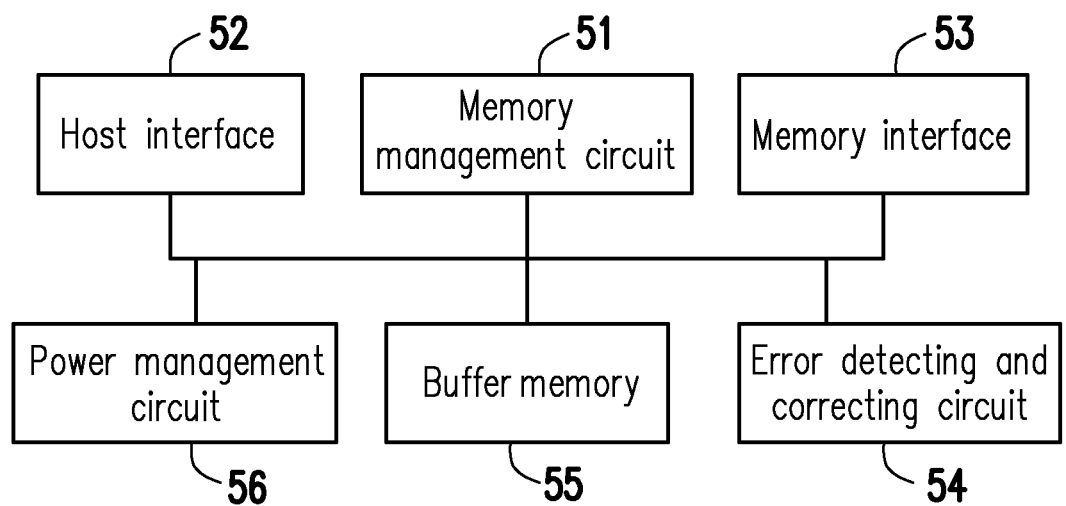
FIG. 5 is a schematic diagram of a memory control circuit unit according to an exemplary embodiment of the disclosure.

FIG. 5 is a schematic diagram of a memory control circuit unit according to an exemplary embodiment of the disclosure. Referring to FIG. 5, the memory control circuit unit 42 includes a memory management circuit 51, a host interface 52, and a memory interface 53.

The memory management circuit 51 is configured to control the overall operation of the memory control circuit unit 42. Specifically, the memory management circuit 51 has multiple control commands, and when the memory storage device 10 operates, the control commands are executed to perform operations such as writing, reading, and erasing data. The following description of the operation of the memory management circuit 51 is equivalent to the description of the operation of the memory control circuit unit 42.

In an exemplary embodiment, the control commands of the memory management circuit 51 are implemented in a firmware form. For example, the memory management circuit 51 has a microprocessor unit (not shown) and a read only memory (not shown), and the control commands are programmed into the read only memory. When the memory storage device 10 operates, the control commands are executed by the microprocessor unit to perform operations such as writing, reading, and erasing data.

In an exemplary embodiment, the control commands of the memory management circuit 51 may also be stored in a specific area of the rewritable non-volatile memory module 43 (for example, a system area dedicated to storing system data in the memory module) in a program code form. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 into the random access memory of the memory management circuit 51. Thereafter, the microprocessor unit runs these control commands to perform operations such as writing, reading, and erasing data.

In an exemplary embodiment, the control commands of the memory management circuit 51 may also be implemented in a hardware form. For example, the memory management circuit 51 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the memory cells or a memory cell group of the rewritable non-volatile memory module 43. The memory writing circuit is configured to issue a write command sequence to the rewritable non-volatile memory module 43 to write data into the rewritable non-volatile memory module 43. The memory reading circuit is configured to issue a read command sequence to the rewritable non-volatile memory module 43 to read data from the rewritable non-volatile memory module 43. The memory erasing circuit is configured to issue an erase command sequence to the rewritable non-volatile memory module 43 to erase data from the rewritable non-volatile memory module 43. The data processing circuit is configured to process the data to be written into the rewritable non-volatile memory module 43 and the data read from the rewritable non-volatile memory module 43. The write command sequence, the read command sequence and the erase command sequence may respectively include one or more program codes or command codes for instructing the rewritable non-volatile memory module 43 to perform corresponding writing, reading, and erasing operations. In an exemplary embodiment, the memory management circuit 51 may also issue other types of command sequences to the rewritable non-volatile memory module 43 to instruct the rewritable non-volatile memory module 43 to perform corresponding operations.

The host interface 52 is coupled to the memory management circuit 51. The memory management circuit 51 may communicate with the host system 11 through the host interface 52. The host interface 52 may be configured to receive and identify the commands and data transmitted by the host system 11. For example, the commands and data transmitted by the host system 11 may be transmitted to the memory management circuit 51 through the host interface 52. In addition, the memory management circuit 51 may transmit data to the host system 11 through the host interface 52. In this exemplary embodiment, the host interface 52 is compatible with the PCI Express standard. However, it should be understood that the disclosure is not limited thereto, and the host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is configured to access the rewritable non-volatile memory module 43. For example, the memory management circuit 51 may access the rewritable non-volatile memory module 43 through the memory interface 53. In other words, the data to be written into the rewritable non-volatile memory module 43 is converted into a format acceptable to the rewritable non-volatile memory module 43 via the memory interface 53. Specifically, if the memory management circuit 51 is to access the rewritable non-volatile memory module 43, the memory interface 53 transmits a corresponding command sequence. For example, the command sequences may include a write command sequence to instruct data writing, a read command sequence to instruct data reading, an erase command sequence to instruct data erasing, and corresponding command sequences for instructing various memory operations (e.g., changing the read voltage level, executing a garbage collection operation, etc.). These command sequences are, for example, generated by the memory management circuit 51 and transmitted to the rewritable non-volatile memory module 43 via the memory interface 53. These command sequences may include one or more signals or data on the bus. The signals or data may include command codes or program codes. For example, the read command sequence includes information such as the read identification code, the memory address, etc.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is configured to execute an error detecting and correcting operation to ensure the correctness of the data. Specifically, when the memory management circuit 51 receives a write command from the host system 11, the error detecting and correcting circuit 54 generates a corresponding error correcting code (ECC) and/or error detecting code (EDC) for the data corresponding to the write command, and the memory management circuit 51 writes the data corresponding to the write command and the corresponding error correcting code and/or error detecting code to the rewritable non-volatile memory module 43. Thereafter, when the memory management circuit 51 reads data from the rewritable non-volatile memory module 43, it simultaneously reads the error correcting code and/or the error detecting code corresponding to the data, and the error detecting and correcting circuit 54 executes the error detecting and correcting operation on the read data according to the error correcting code and/or error detecting code.

The buffer memory 55 is coupled to the memory management circuit 51 and configured to temporarily store data. The power management circuit 56 is coupled to the memory management circuit 51 and is configured to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
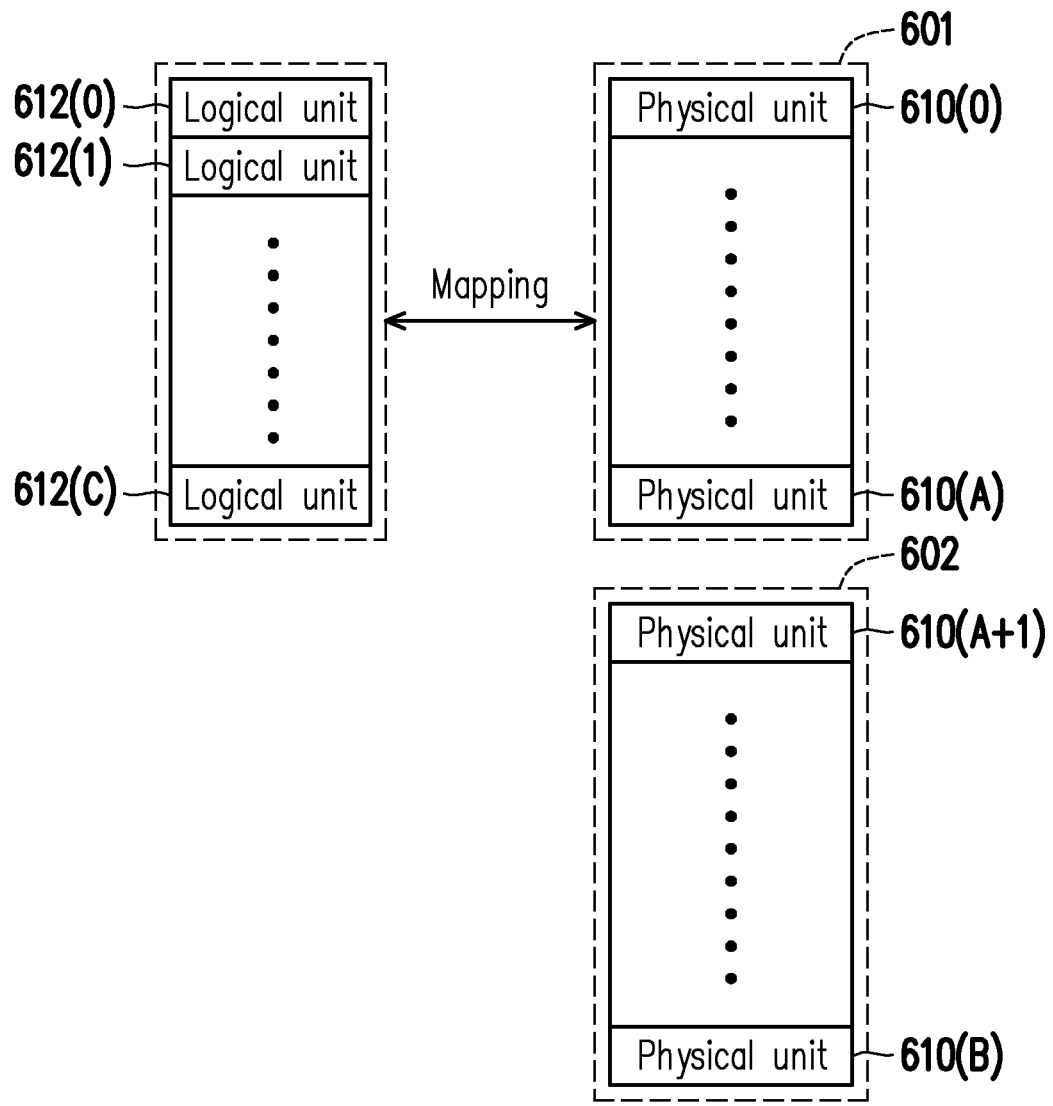
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Referring to FIG. 6, the memory management circuit 51 may logically group the physical management units 610(0) to 610(B) in the rewritable non-volatile memory module 43 into a storage area 601 and a spare area 602.

In an exemplary embodiment, a physical management unit includes one or more physical blocks. A physical management unit may include multiple physical nodes. In an exemplary embodiment, each physical node may store data with a data length of 4 KB. In an exemplary embodiment, each physical node may also store more or less data, and the disclosure is not limited thereto.

The physical management units 610(0) to 610(A) in the storage area 601 are configured to store user data (e.g., user data from the host system 11 in FIG. 1). For example, the physical management units 610(0) to 610(A) in the storage area 601 may store valid data and invalid data. The physical management units 610(A+1) to 610(B) in the spare area 602 do not store data (e.g., valid data). For example, if a certain physical management unit does not store valid data, this physical management unit may be associated (or added) to the spare area 602. In addition, the physical management units in the spare area 602 (or the physical management units not storing valid data) may be erased. When new data is written, one or more physical management units may be extracted from the spare area 602 to store the new data. In an exemplary embodiment, the spare area 602 is also referred to as a free pool.

The logic units 612(0) to 612(C) may be configured in the memory management circuit 51 to map the physical management units 610(0) to 610(A) in the storage area 601. In an exemplary embodiment, each of the logics corresponds to a logical address. For example, a logical address may include one or more logical block addresses (LBA) or other logical management units. In an exemplary embodiment, a logic may also correspond to a logical programming unit or be formed by multiple consecutive or non-consecutive logical addresses.

It should be noted that a logic may be mapped to one or more physical management units. If a certain physical management unit is currently mapped by a certain logic, it indicates that the data currently stored in this physical management unit includes valid data. On the contrary, if a certain physical management unit is not currently mapped by any logic, it indicates that the data currently stored in this physical management unit is invalid data.

Similarly, if the data currently stored by a certain physical node belongs to a certain logic, it indicates that this physical node currently stores valid data. On the contrary, if the data currently stored in a certain physical node does not belong to any logic, it indicates that the physical node does not currently store valid data. In an exemplary embodiment, a physical node that currently stores valid data is also referred to as a valid node, and/or a physical node that currently does not store valid data is also referred to as an invalid node.

The memory management circuit 51 may record the mapping information (also referred to as the logical to physical mapping information) describing the mapping relationship between logics and physical management units in at least one mapping table (also referred to as the logical to physical mapping table). When the host system 11 reads data from the memory storage device 10 or writes data to the memory storage device 10, the memory management circuit 51 may access the rewritable non-volatile memory module 43 according to the information in the mapping table (i.e., the mapping information).

In an exemplary embodiment, the memory management circuit 51 may establish a valid node management table (also referred to as a first valid node management table) corresponding to a physical management unit (also referred to as a first physical management unit). For example, the first physical management unit may be any one of the physical management units 610(0) to 610(B) in FIG. 6. The memory management circuit 51 may store the first valid node management table in the rewritable non-volatile memory module 43.

In an exemplary embodiment, the memory management circuit 51 may store the first valid node management table in the system area of the rewritable non-volatile memory module 43. This system area may be specially configured to store system data. For example, the user or the host system 11 cannot access the data in this system area. In this way, the user or the host system 11 may avoid accidentally modifying or deleting the data in the system area, thereby causing the memory storage device 10 to fail to operate normally.

In an exemplary embodiment, the memory management circuit 51 may store the valid node management data (also referred to as the first valid node management data) in the first valid node management table. In particular, the first valid node management data may reflect the distribution status of the valid nodes in the first physical management unit. For example, the first valid node management data may reflect whether any valid node is included in the first physical management unit. In the case that the first physical management unit includes at least one valid node, the first valid node management data may further reflect the distribution of valid nodes in the first physical management unit (e.g., which physical nodes in the first physical management unit are valid nodes or invalid nodes) and/or the total number of valid nodes in the first physical management unit.

Figure 7:
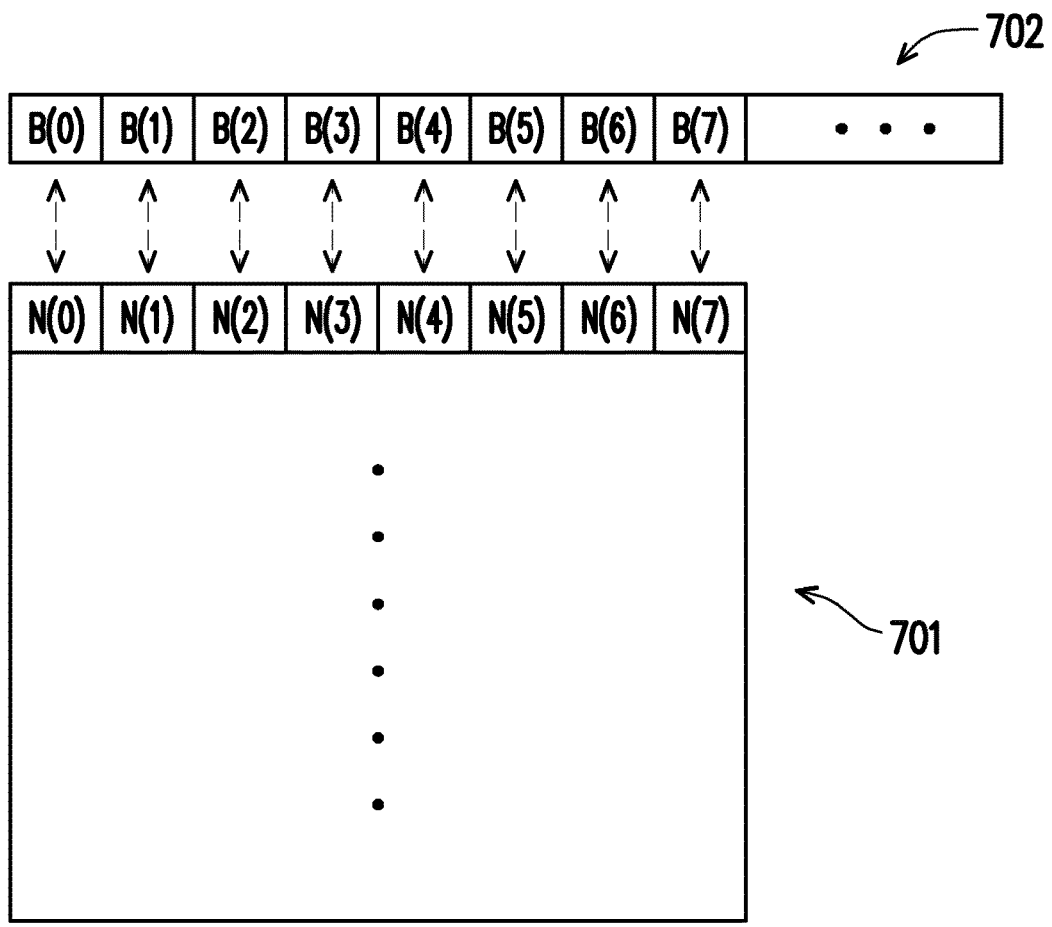
FIG. 7 is a schematic diagram of a valid data management table according to an exemplary embodiment of the disclosure.

FIG. 7 is a schematic diagram of a valid data management table according to an exemplary embodiment of the disclosure. Referring to FIG. 7, the memory management circuit 51 may establish a valid node management table 702 (i.e., the first valid node management table) corresponding to the physical management unit 701 (i.e., the first physical management unit). The memory management circuit 51 may store the valid node management data (i.e., the first valid node management data) corresponding to the physical management unit 701 in the valid node management table 702.

In an exemplary embodiment, the valid node management table 702 may record multiple identification bits B(0) to B(7), and the physical management unit 701 includes multiple physical nodes N(0) to N(7). In particular, the identification bit B(i) in the identification bits B(0) to B(7) may be used to indicate whether the physical node N(i) is a valid node. For example, in the valid node management table 702, it is assumed that the identification bits B(2), B(4), B(5), and B(6) are bit "1" and identification bits B(0), B(1), B(3), and B(7) are bit "0", indicating that in the physical management unit 701, the physical nodes N(2), N(4), N(5), and N(6) are valid nodes (i.e., physical nodes that currently store valid data), and the physical nodes N(0), N(1), N(3), and N(7) are invalid nodes (i.e., physical nodes that currently do not store valid data).

In an exemplary embodiment, the memory management circuit 51 may obtain the distribution status of the valid nodes in the physical management unit 701 according to the information (i.e., the first valid node management data) recorded in the valid node management table 702. For example, according to the identification bits B(0) to B(7), the memory management circuit 51 may determine that the physical nodes N(2), N(4), N(5), and N(6) are valid nodes and/or the physical nodes N(0), N(1), N(3), and N(7) are invalid nodes. In addition, the valid node management table 702 may also record more identification bits to reflect the status (e.g., whether they are valid nodes or not) of other physical nodes in the physical management unit 701.

In an exemplary embodiment, after the first valid node management table is established, the memory management circuit 51 may continuously update, maintain, and manage the first valid node management table to reflect the latest distribution status of valid nodes in the first physical management unit. In an exemplary embodiment, in response to the valid node not existing in the first physical management unit, the memory management circuit 51 may delete the first valid node management table. Alternatively, in an exemplary embodiment, even if the valid node does not exist in the first physical management unit, the memory management circuit 51 may not delete (i.e., keep) the first valid node management table.

In an exemplary embodiment, the memory management circuit 51 may establish an index table and store address information of one or more valid node management tables (including the first valid node management table) in the index table. When querying the first valid node management table, the memory management circuit 51 may read the index table to obtain address information of the first valid node management table. According to the address information, the memory management circuit 51 may read the first valid node management table from the rewritable non-volatile memory module 43.

Figure 8:
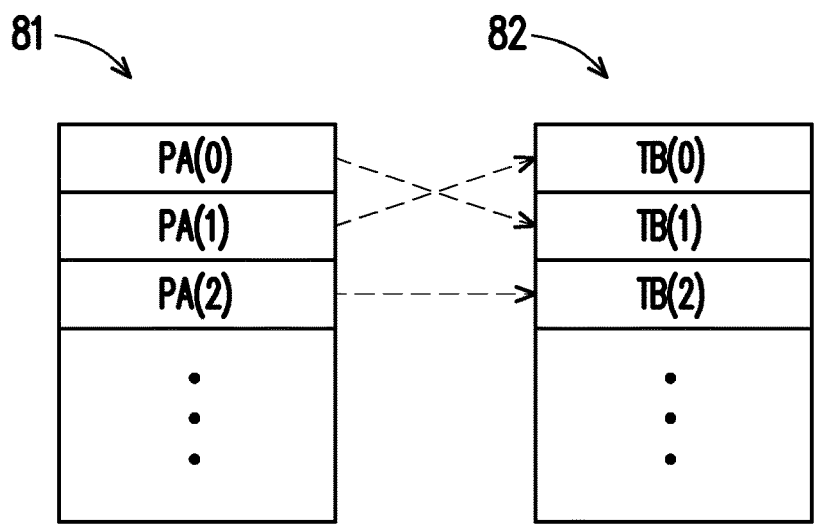
FIG. 8 is a schematic diagram of an index table according to an exemplary embodiment of the disclosure.

FIG. 8 is a schematic diagram of an index table according to an exemplary embodiment of the disclosure. Referring to FIG. 8, the memory management circuit 51 may establish an index table 81. The memory management circuit 51 may store address information PA(0) to PA(2) corresponding to the valid node management tables TB(1) to TB(2) in the index table 81. For example, the address information PA(i) may correspond to the valid node management table TB(i) and reflect the storage address of the valid node management table TB(i) in the physical management unit 82. In an exemplary embodiment, the physical management unit 82 may be a physical management unit specially configured to store system data in the rewritable non-volatile memory module 43 (i.e., a physical management unit belonging to the system area). In an exemplary embodiment, the physical management unit 82 may be any physical management unit in the rewritable non-volatile memory module 43.

In an exemplary embodiment, when reading the valid node management table TB(i) (i.e., the first valid node management table), the memory management circuit 51 may obtain the storage address of the valid node management table TB(i) in the physical management unit 82 according to the address information PA(i) recorded in the index table 81. Then, the memory management circuit 51 may read the valid node management table TB(i) from the storage address according to the address information PA(i).

In an exemplary embodiment, in response to the valid node not existing in the first physical management unit, the memory management circuit 51 may remove the address information of the first valid node management table corresponding to the first physical management unit from the index table. For example, assuming that the physical management unit corresponding to the valid node management table TB(0) does not have any valid node, the memory management circuit 51 may remove the address information PA(0) of the valid node management table TB(0) from the index table 81. At the same time, the memory management circuit 51 may delete the valid node management table TB(0). Thereby, the storage space may be used more effectively.

In an exemplary embodiment, the memory management circuit 51 may receive one or more operation commands from the host system 11. The operation command may be configured to change the data storage status of the first physical management unit. For example, the operation command may include a write command and/or an erase command. The write command is configured to instruct to write or update data belonging to a specific logic. The erase command may be configured to instruct to erase or delete data belonging to a specific logic. The specific logic is mapped to the first physical management unit. In an exemplary embodiment, the operation commands may also include other types of commands, as long as they may be configured to change the data storage status of the first physical management unit.

In an exemplary embodiment, in response to the operation command, the memory management circuit 51 may update the data (i.e., the first valid node management data) in the first valid node management table. For example, the updated first valid node management data may reflect the latest distribution status of the valid nodes in the first physical management unit.

Figure 9A:
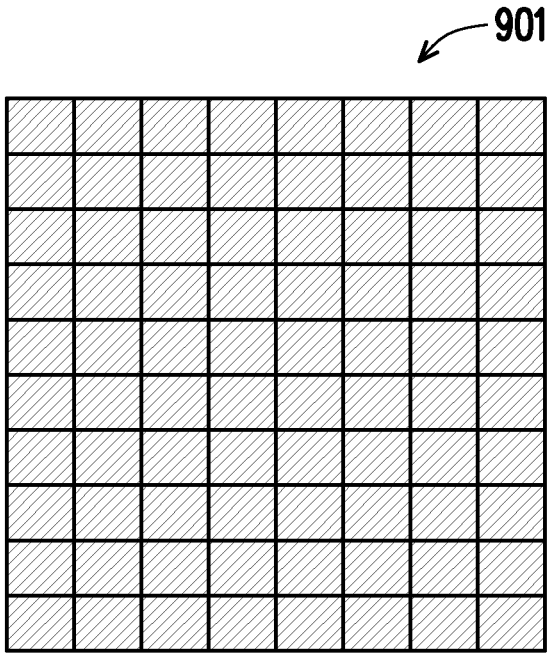
FIG. 9A to FIG. 9C are schematic diagrams of updating valid node management data according to an exemplary embodiment of the disclosure.
Figure 9A:
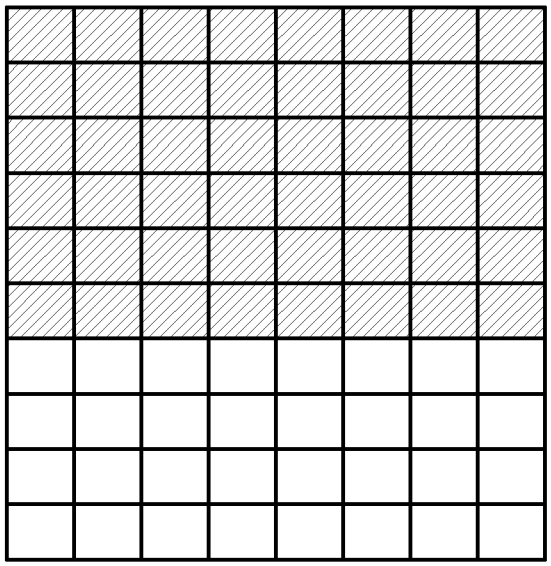
Figure 9B:
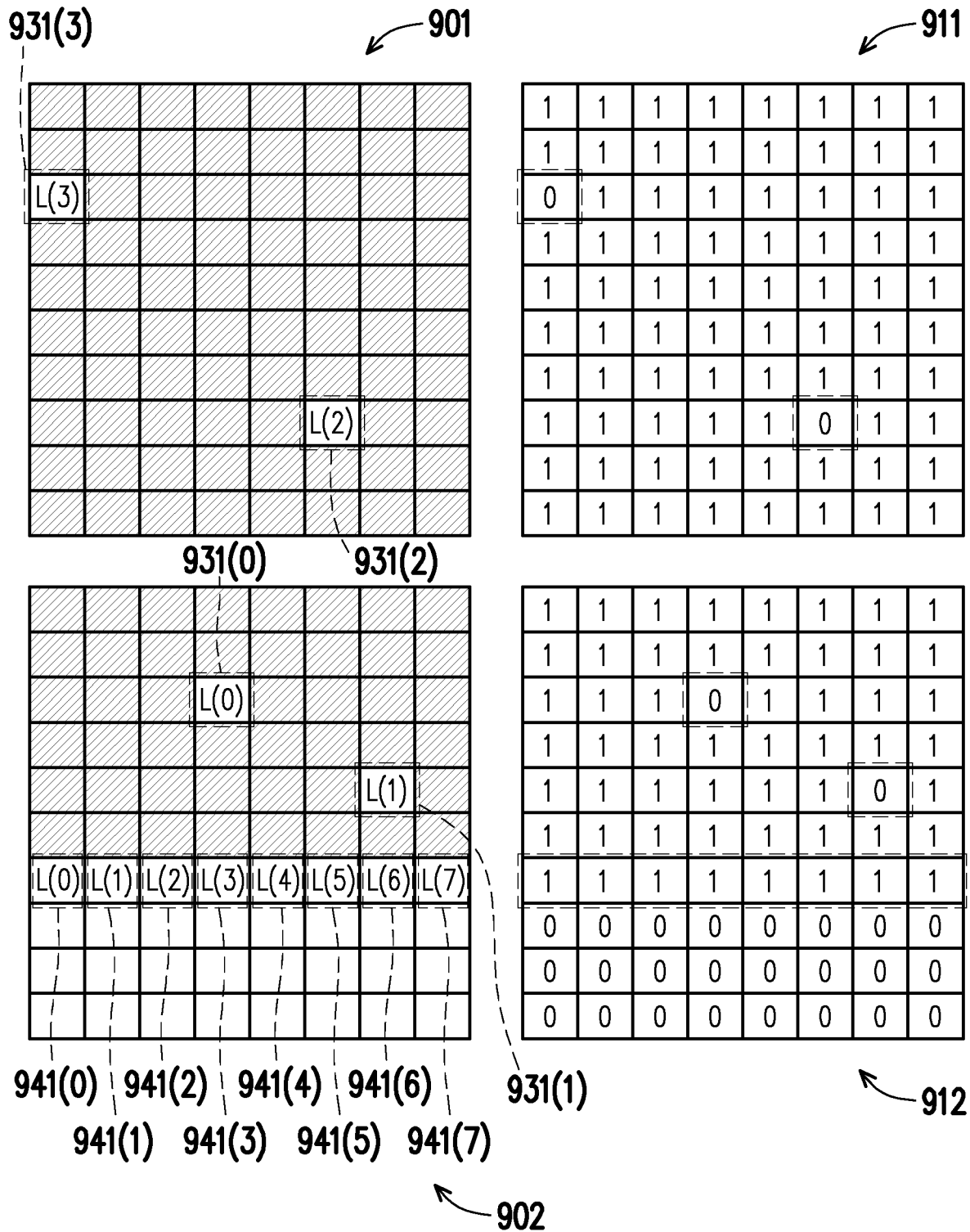
Figure 9C:
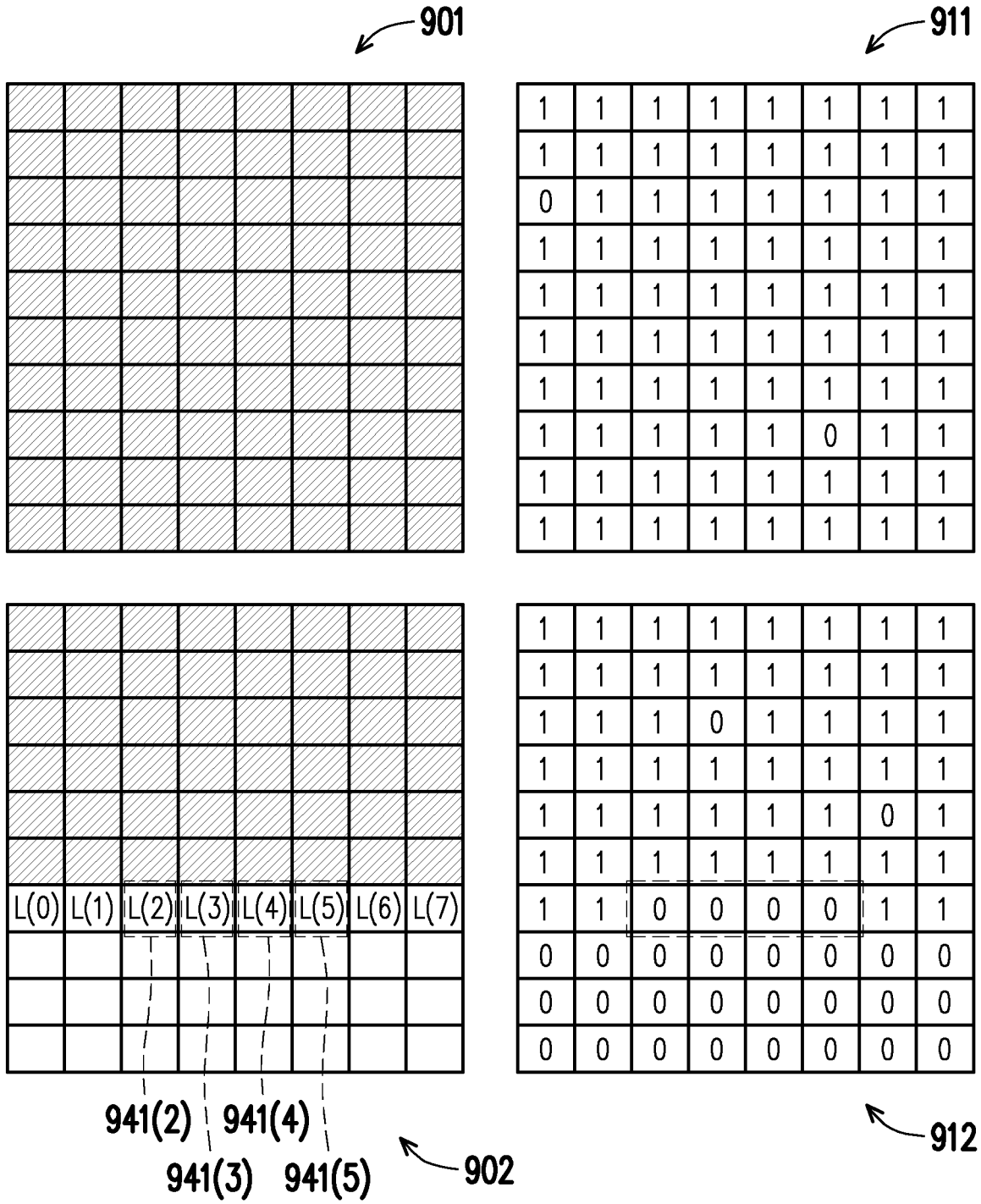

FIG. 9A to FIG. 9C are schematic diagrams of updating valid node management data according to an exemplary embodiment of the disclosure. Referring to FIG. 9A, it is assumed that the valid node management table 911 is configured to record the valid node management data corresponding to the physical management unit 901, and the valid node management table 912 is configured to record the valid node management data corresponding to the physical management unit 902. In addition, in the exemplary embodiment of FIG. 9A, the physical nodes marked with slashes indicate the physical nodes in which data has been written (i.e., stored data already exist), and the physical nodes not marked with slashes represent physical nodes in which data has not been written (i.e., stored data does not exist).

It should be noted that, in the exemplary embodiment of FIG. 9A, it is assumed that the physical nodes marked with slashes in the physical management units 901 and 902 are currently storing valid data. Therefore, the identification bits corresponding to these valid nodes in the valid node management tables 911 and 912 are all bit "1", while the identification bits corresponding to the remaining invalid nodes are bit "0".

Referring to FIG. 9B, following the exemplary embodiment in FIG. 9A, it is assumed that data belonging to logics L(0) to L(3) are currently respectively stored in physical nodes 931(0) to 931(3). In an exemplary embodiment, the memory management circuit 51 may receive at least one operation command (also referred to as a first operation command) from the host system 11. The first operation command instructs to update the data belonging to the logics L(0) to L(7). In response to the first operation command, the memory management circuit 51 may mark the data currently stored in the physical nodes 931(0) to 931(3) as invalid data and store new data (i.e., valid data) belonging to the logics L(0) to L(7) into the physical nodes 941(0) to 941(7). In other words, in response to the first operation command, the data storage status of the physical management units 901 and 902 changes.

In the exemplary embodiment of FIG. 9B, in response to changes in the data storage status of the physical management units 901 and 902, the memory management circuit 51 may update the valid node management data in the valid node management tables 911 and 912. For example, in response to the data stored in the physical nodes 931(0) to 931(3) becoming invalid data, the memory management circuit 51 may update multiple identification bits corresponding to the physical nodes 931(0) to 931(3) in the valid node management tables 911 and 912 from bit "1" to bit "0". In addition, in response to the valid data being stored in the physical nodes 941(0) to 941(7), the memory management circuit 51 may update multiple identification bits corresponding to the physical nodes 941(0) to 941(7) in the valid node management table 912 from bit "0" to bit "1".

Referring to FIG. 9C, following the exemplary embodiment of FIG. 9B, it is assumed that the memory management circuit 51 continues to receive at least one operation command (also referred to as a second operation command) from the host system 11. The second operation command instructs to delete the data belonging to the logics L(2) to L(5). In response to the second operation command, the memory management circuit 51 may mark the data stored in the physical nodes 941(2) to 941(5) as invalid data. In other words, in response to the second operation command, the data storage status of the physical management units 901 and 902 changes again.

In the exemplary embodiment of FIG. 9C, in response to changes in the data storage status of the physical management units 901 and 902, the memory management circuit 51 may update the valid node management data in the valid node management tables 911 and 912 again. For example, in response to the data stored in the physical nodes 941(2) to 941(5) becoming invalid data, the memory management circuit 51 may update multiple identification bits corresponding to the physical nodes 941(2) to 941(5) in the valid node management table 912 from bit "1" to bit "0".

In other words, in the exemplary embodiment of FIG. 9A to FIG. 9C, by continuously updating, maintaining, and managing the valid node management tables 911 and 912, the valid node management data in the valid node management tables 911 and 912 may continuously reflect the latest data storage status of the physical management units 901 and 902 and/or the latest distribution status of valid nodes in the physical management units 901 and 902.

In an exemplary embodiment, the memory management circuit 51 may also establish a compressed table. The memory management circuit 51 may store compressed data corresponding to the first valid node management data in the compressed table. The compressed data may be generated according to the first valid node management data. For example, the memory management circuit 51 may perform compression processing on the first valid node management data to generate the compressed data. In addition, the compressed table may also be stored in the system area of the rewritable non-volatile memory module 43.

In an exemplary embodiment, compared with the first valid node management data which uses a single identification bit to indicate whether a single physical node is a valid node (as shown in FIG. 7, FIG. 9A to FIG. 9C), the compressed data is changed to use fewer identification bits to indicate whether the same number of physical nodes are all valid nodes (e.g., a single identification bit is configured to indicate whether multiple physical nodes are all valid nodes). By compressing the first valid node management data, the usage of storage space may be effectively reduced.

In an exemplary embodiment, the compressed data includes first compressed data. The memory management circuit 51 may generate the first compressed data according to the valid node management data within the specific data range (also referred to as the target range) in the first valid node management data. In an exemplary embodiment, the at least one identification bit in the first compressed data may reflect the value distribution status of the valid node management data within the target range in the first valid node management data based on a smaller amount of data.

In an exemplary embodiment, the at least one identification bit in the first compressed data may reflect an offset value of the target range compared to the first valid node management table based on a smaller amount of data. The offset value may be configured to position the target range in the first valid node management table. Then, the memory management circuit 51 may determine the valid node management data belonging to the target range in the first valid node management table according to the offset value.

In an exemplary embodiment, the first compressed data may include flag bits and identification bits corresponding to the flag bits. If the flag bit is the first value, the identification bit may reflect a value distribution status of multiple identification bits belonging to the target range in the first valid node management data. In addition, if the flag bit is the second value, the identification bit may reflect the offset value of the target range compared to the first valid node management table.

Figure 10:
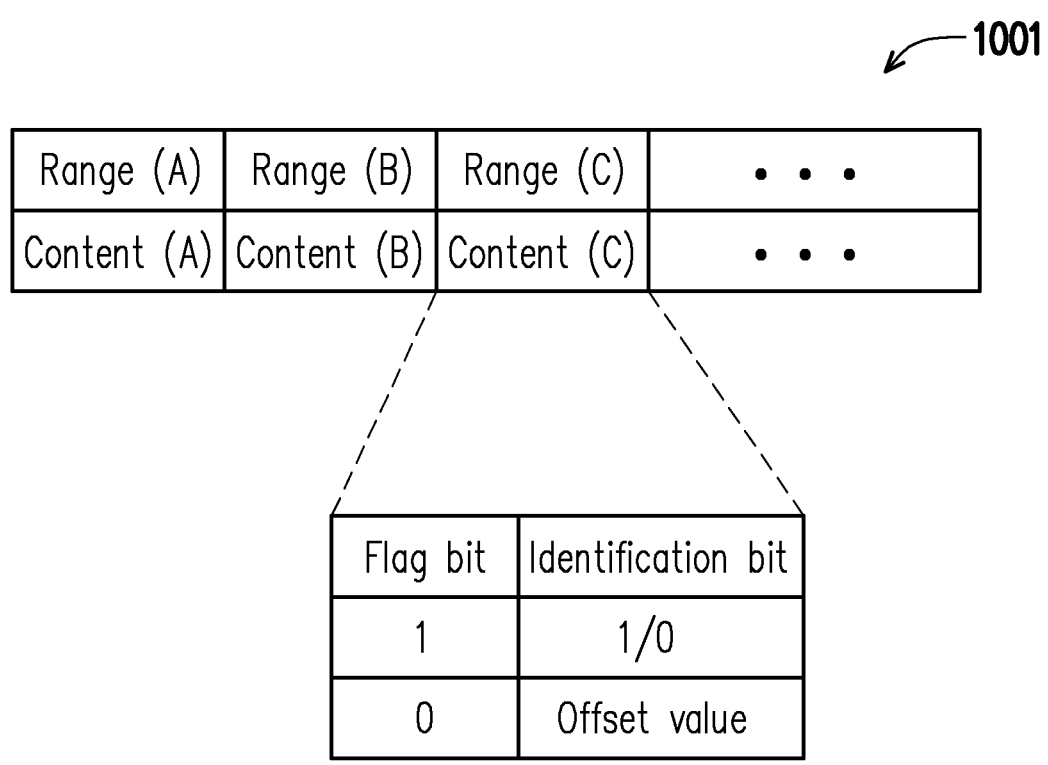
FIG. 10 is a schematic diagram of a compressed table according to an exemplary embodiment of the disclosure.

FIG. 10 is a schematic diagram of a compressed table according to an exemplary embodiment of the disclosure. Referring to FIG. 10, the compressed table 1001 may store multiple compressed data. The compressed data may be generated according to the first valid node management data. For example, the compressed data includes content (A) to content (C) respectively corresponding to range (A) to range (C). The range (i) corresponds to a target range in the first valid node management data, and the content (i) is the compressed data corresponding to the target range.

Taking the content (C) corresponding to the range (C) as an example, the content (C) may include a flag bit and an identification bit. If the flag bit in the content (C) is the first value (e.g., bit "1"), the identification bit in the content (C) may reflect the numerical distribution status of the multiple identification bits corresponding to the range (C) in the first valid node management data. For example, when the flag bit in the content (C) is the first value (e.g., bit "1"), if the identification bit in the content (C) is bit "1", it indicates that the multiple identification bits corresponding to the range (C) in the first valid node management data are all bit "1". In addition, when the flag bit in the content (C) is the first value (e.g., bit "1"), if the identification bit in the content (C) is bit "0", it indicates that the multiple identification bits corresponding to the range (C) in the first valid node management data are all bit "0". However, in another exemplary embodiment, the identification bits in the compressed data may also present the value distribution status of the multiple identification bits in the original first valid node management data in other ways, and the disclosure is not limited thereto. On the other hand, if the flag bit in the content (C) is the second value (e.g., bit "0"), the identification bit in the content (C) may reflect the offset value of the range (C) compared to the first valid node management table.

In an exemplary embodiment, the memory management circuit 51 may obtain the distribution status of the valid nodes in the first physical management unit according to the compressed data in the compressed table. Taking the compressed table 1001 as an example, assuming that the flag bit in the content (A) is bit "1", the memory management circuit 51 may obtain the status (e.g., all are valid nodes or invalid nodes) of multiple physical nodes corresponding to the range (A) in the first physical management unit at once according to the identification bit in the content (A). In addition, assuming that the flag bit in the content (B) is bit "0", the memory management circuit 51 may obtain the offset value of the range (B) compared to the first valid node management table according to the identification bit in the content (B). Then, the memory management circuit 51 may read the identification bits corresponding to multiple physical nodes from the first valid node management table according to the offset value. Then, the memory management circuit 51 may obtain the status of multiple physical nodes according to the identification bits.

It should be noted that the recording method of the compressed data in the compressed table 1001 described in the exemplary embodiment of FIG. 10 is only an example. In other exemplary embodiments, the recording method of the compressed data may also be adjusted according to practical requirements, and the disclosure is not limited thereto.

Figure 11:
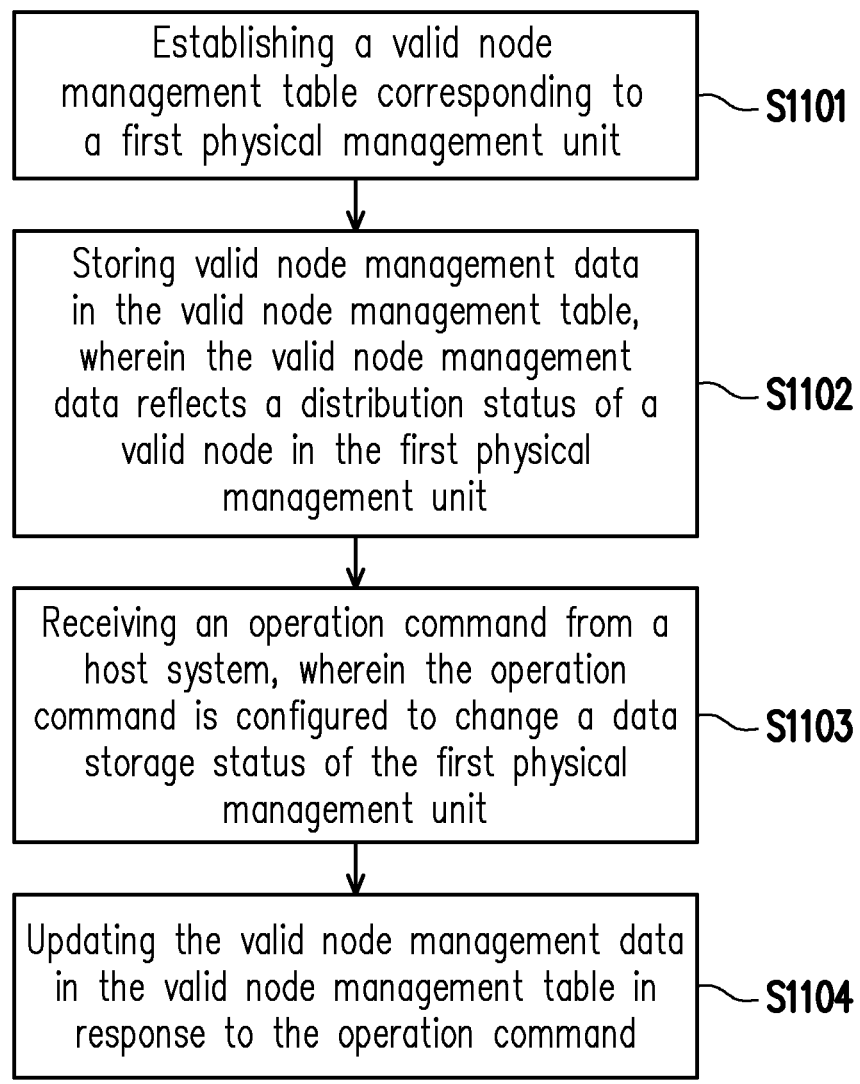
FIG. 11 is a flowchart of a valid node management method according to an exemplary embodiment of the disclosure.

FIG. 11 is a flowchart of a valid node management method according to an exemplary embodiment of the disclosure. Referring to FIG. 11, in step S1101, a valid node management table corresponding to the first physical management unit is established. In step S1102, the valid node management data is stored in the valid node management table, in which the valid node management data reflects the distribution status of the valid nodes in the first physical management unit. In step S1103, an operation command is received from the host system, in which the operation command is configured to change the data storage status of the first physical management unit. In step S1104, in response to the operation command, the valid node management data in the valid node management table is updated.

However, each step in FIG. 11 has been described in detail as above, and are not repeated herein. It should be noted that each of the steps in FIG. 11 may be implemented as multiple program codes or circuits, and the disclosure is not limited thereto. In addition, the method in FIG. 11 may be used in conjunction with the above-mentioned exemplary embodiments, or may be used alone, and the disclosure is not limited thereto.

In summary, the valid node management method, memory storage device, and memory control circuit unit proposed by the exemplary embodiments of the disclosure may use the valid node management table to reflect the current data storage status of the specific physical management unit and/or the distribution status of valid nodes in the specific physical management unit. In addition, by dynamically updating, maintaining, and managing the valid node management table, the data in the valid node management table may immediately reflect the latest data storage status of the specific physical management unit and/or the latest distribution status of valid nodes in the specific physical management unit. Thereby, the execution efficiency of any data processing program (e.g., a recycling program or a wear leveling program) that needs to refer to the current data storage status of the physical management unit may be effectively improved.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A valid node management method for a rewritable non-volatile memory module, wherein the rewritable non-volatile memory module comprises a plurality of physical management units, and the valid node management method comprises:
    establishing a valid node management table corresponding to a first physical management unit in the physical management units;
    storing valid node management data in the valid node management table, wherein the valid node management data reflects a distribution status of a valid node in the first physical management unit;
    receiving an operation command from a host system, wherein the operation command is configured to change a data storage status of the first physical management unit;
    in response to the operation command, updating the valid node management data in the valid node management table; and
    establishing a compressed table; and
    storing compressed data corresponding to the valid node management data in the compressed table,
    wherein compared with the valid node management data, the compressed data uses fewer identification bits to indicate a status of a same number of physical nodes in the first physical management unit.

2. The valid node management method according to claim 1, wherein an identification bit in the valid node management data is configured to indicate whether a single physical node in the first physical management unit is the valid node.

3. The valid node management method according to claim 1, further comprising:
    in response to the valid node not existing in the first physical management unit, deleting the valid node management table.

4. The valid node management method according to claim 1, further comprising:
    establishing an index table;
    storing address information of the valid node management table in the index table;
    reading the index table to obtain the address information of the valid node management table; and
    reading the valid node management table from the rewritable non-volatile memory module according to the address information.

5. The valid node management method according to claim 4, further comprising:
    in response to the valid node not existing in the first physical management unit, removing the address information of the valid node management table from the index table.

6. The valid node management method according to claim 1, wherein the compressed data comprises a flag bit and an identification bit corresponding to the flag bit,
    if the flag bit is a first value, the identification bit reflects a value distribution status of a plurality of identification bits within a target range in the valid node management data, and
    if the flag bit is a second value, the identification bit reflects an offset value of the target range compared to the valid node management table.

7. A memory storage device, comprising:
    a connection interface unit, configured to couple to a host system;
    a rewritable non-volatile memory module, wherein the rewritable non-volatile memory module comprises a plurality of physical management units; and
    a memory control circuit unit, coupled to the connection interface unit and the rewritable non-volatile memory module,
    wherein the memory control circuit unit is configured to:
    establish a valid node management table corresponding to a first physical management unit in the physical management units;
    store valid node management data in the valid node management table, wherein the valid node management data reflects a distribution status of a valid node in the first physical management unit;
    receive an operation command from the host system, wherein the operation command is configured to change a data storage status of the first physical management unit;
    in response to the operation command, update the valid node management data in the valid node management table;
    establish a compressed table; and
    store compressed data corresponding to the valid node management data in the compressed table,
    wherein compared with the valid node management data, the compressed data uses fewer identification bits to indicate a status of a same number of physical nodes in the first physical management unit.

8. The memory storage device according to claim 7, wherein an identification bit in the valid node management data is configured to indicate whether a single physical node in the first physical management unit is the valid node.

9. The memory storage device according to claim 7, wherein the memory control circuit unit is further configured to:

in response to the valid node not existing in the first physical management unit, delete the valid node management table.

10. The memory storage device according to claim 7, wherein the memory control circuit unit is further configured to:
establish an index table;
store address information of the valid node management table in the index table;
read the index table to obtain the address information of the valid node management table; and
read the valid node management table from the rewritable non-volatile memory module according to the address information.

11. The memory storage device according to claim 10, wherein the memory control circuit unit is further configured to:
in response to the valid node not existing in the first physical management unit, remove the address information of the valid node management table from the index table.

12. The memory storage device according to claim 7, wherein the compressed data comprises a flag bit and an identification bit corresponding to the flag bit,
if the flag bit is a first value, the identification bit reflects a value distribution status of a plurality of identification bits within a target range in the valid node management data, and
if the flag bit is a second value, the identification bit reflects an offset value of the target range compared to the valid node management table.

13. A memory control circuit unit for controlling a rewritable non-volatile memory module, wherein the rewritable non-volatile memory module comprises a plurality of physical management units, and the memory control circuit unit comprises:
a host interface, configured to couple to a host system;
a memory interface, configured to couple to the rewritable non-volatile memory module; and
a memory management circuit, coupled to the host interface and the memory interface,
wherein the memory management circuit is configured to:
establish a valid node management table corresponding to a first physical management unit in the physical management units;
store valid node management data in the valid node management table, wherein the valid node management data reflects a distribution status of a valid node in the first physical management unit;
receive an operation command from the host system, wherein the operation command is configured to change a data storage status of the first physical management unit;
in response to the operation command, update the valid node management data in the valid node management table;
establish a compressed table; and
store compressed data corresponding to the valid node management data in the compressed table,
wherein compared with the valid node management data, the compressed data uses fewer identification bits to indicate a status of a same number of physical nodes in the first physical management unit.

14. The memory control circuit unit according to claim 13, wherein an identification bit in the valid node management data is configured to indicate whether a single physical node in the first physical management unit is the valid node.

15. The memory control circuit unit according to claim 13, wherein the memory management circuit is further configured to:
in response to the valid node not existing in the first physical management unit, delete the valid node management table.

16. The memory control circuit unit according to claim 13, wherein the memory management circuit is further configured to:
establish an index table;
store address information of the valid node management table in the index table;
read the index table to obtain the address information of the valid node management table; and
read the valid node management table from the rewritable non-volatile memory module according to the address information.

17. The memory control circuit unit according to claim 16, wherein the memory management circuit is further configured to:
in response to the valid node not existing in the first physical management unit, remove the address information of the valid node management table from the index table.

18. The memory control circuit unit according to claim 13, wherein the compressed data comprises a flag bit and an identification bit corresponding to the flag bit,
if the flag bit is a first value, the identification bit reflects a value distribution status of a plurality of identification bits within a target range in the valid node management data, and if the flag bit is a second value, the identification bit reflects an offset value of the target range compared to the valid node management table.

* * * * *